US009187011B2

(12) United States Patent
Rouxel et al.

(10) Patent No.: US 9,187,011 B2
(45) Date of Patent: Nov. 17, 2015

(54) VEHICLE SEAT PROVIDED WITH MEANS FOR ATTACHING A REMOVABLE TRAY

(71) Applicant: RENAULT S.A.S., Boulogne Billancourt (FR)

(72) Inventors: Yves Rouxel, Versailles (FR); Herve Folliot, Maule (FR)

(73) Assignee: RENAULT S.A.S., Boulogne Billancourt (FR)

( * ) Notice: Subject to any disclaimer, the term of this patent is extended or adjusted under 35 U.S.C. 154(b) by 0 days.

(21) Appl. No.: 14/358,905

(22) PCT Filed: Nov. 5, 2012

(86) PCT No.: PCT/EP2012/071838
§ 371 (c)(1),
(2) Date: May 16, 2014

(87) PCT Pub. No.: WO2013/072210
PCT Pub. Date: May 23, 2013

(65) Prior Publication Data
US 2014/0327279 A1  Nov. 6, 2014

(30) Foreign Application Priority Data

Nov. 16, 2011 (FR) ...................... 11 60413

(51) Int. Cl.
A47B 39/00 (2006.01)
B60N 2/20 (2006.01)
B60N 3/00 (2006.01)
A47C 7/40 (2006.01)

(52) U.S. Cl.
CPC ............... B60N 2/206 (2013.01); A47C 7/407 (2013.01); B60N 3/002 (2013.01); B60N 3/004 (2013.01)

(58) Field of Classification Search
CPC .......... A47C 7/62; B60R 7/043; B60N 2/206; B60N 3/004
USPC .................. 297/167, 188.01, 188.04, 188.05, 297/188.06, 188.07, 188.21
See application file for complete search history.

(56) References Cited

U.S. PATENT DOCUMENTS

D368,189 S  *  3/1996  Bro et al. ........................ D6/480
6,059,358 A  *  5/2000  Demick et al. ........... 297/188.04
(Continued)

FOREIGN PATENT DOCUMENTS

EP  1 366 951  12/2003
FR  2 911 548  7/2008
(Continued)

OTHER PUBLICATIONS

International Search Report Issued Apr. 17, 2013 in PCT/EP12/071838 Filed Nov. 5, 2012.
(Continued)

*Primary Examiner* — Laurie Cranmer
(74) *Attorney, Agent, or Firm* — Oblon, McClelland, Maier & Neustadt, L.L.P.

(57) ABSTRACT

A motor vehicle seat including a seat part and a foldable seatback including a rear face configured to be situated in a substantially horizontal position when the seatback has been folded. The rear face of the seatback includes an attachment mechanism configured to engage with an independent tray, to hold the tray in an erect position on the rear face once the seatback has been folded.

13 Claims, 3 Drawing Sheets

(56) References Cited

U.S. PATENT DOCUMENTS

| | | | |
|---|---|---|---|
| 6,220,660 B1* | 4/2001 | Bedro et al. | 297/188.04 |
| 6,273,310 B1* | 8/2001 | Gregory | 224/275 |
| 6,382,745 B1* | 5/2002 | Adkins | 312/223.3 |
| 6,702,375 B1* | 3/2004 | Laskowski et al. | 297/188.07 |
| 7,300,105 B2* | 11/2007 | Jasinski et al. | 297/188.04 |
| 7,303,226 B2* | 12/2007 | Bernstein et al. | 296/190.01 |
| 7,562,931 B2* | 7/2009 | Stojanovic | 297/188.04 |
| 7,607,726 B2* | 10/2009 | Orlo et al. | 297/125 |
| 8,167,366 B2* | 5/2012 | Charpentier et al. | 297/125 |
| 2002/0060481 A1* | 5/2002 | Jones | 297/188.04 |
| 2010/0109389 A1* | 5/2010 | Charpentier et al. | 297/173 |

FOREIGN PATENT DOCUMENTS

| | | |
|---|---|---|
| FR | 2 924 387 | 6/2009 |
| GB | 2 424 575 | 10/2006 |

OTHER PUBLICATIONS

U.S. Appl No. 14/358,893, filed May 16, 2014, Rouxel, et al.

* cited by examiner

VEHICLE SEAT PROVIDED WITH MEANS FOR ATTACHING A REMOVABLE TRAY

BACKGROUND

The invention relates to a vehicle seat which is provided with means for fixing a removable tray. Vehicle seats are unavoidable and imposing elements in a vehicle passenger space and it may therefore be found to be advantageous to configure them so that they can ensure additional functions, whilst retaining a substantially constant spatial requirement. A vehicle seat according to the invention has been modified in relation to a conventional seat in order to fulfill a new function.

BRIEF SUMMARY

Vehicle seats provided with a tray exist and patents already relate to them. For example, it is possible to cite the patent FR2911548 which relates to a vehicle seat, the rear face of the backrest of which is provided with a movable tray. More specifically, once the backrest has been folded onto the seat member, the tray is in a substantially horizontal position and can pivot about a vertical axis in order to be able to be moved away laterally at one side or the other of the seat. Although this tray is functional and ergonomic in terms of its support function, it is connected permanently to the seat without being able to be dissociated therefrom, and without being able to be used at a different location from the one in which it is stored on the backrest of said seat.

A vehicle seat according to the invention has a foldable backrest which is provided with fixing means which are intended to stow a tray in a deployed position. This is because, once folded, the backrest of the seat is in a substantially horizontal position and may be used as a support platform for a tray, in an operational position for a person sitting in an adjacent seat. The fixing means which are specific to the backrest of the seat cooperate with the tray so that the tray remains in a non-removable manner in a given raised position. A tray in an operational position and a tray which may either be readily read if a text or drawings were visible thereon, or which may be used as a support for a paper document on which it would be possible to write.

The invention relates to a seat of a motor vehicle comprising a seat member and a foldable backrest comprising a rear face which is capable of being in a substantially horizontal position once said backrest has been folded down. The main technical feature of a seat according to the invention is that the rear face of the backrest is provided with fixing means which are capable of cooperating with an independent tray in order to retain it in a deployed position on said rear face once the backrest has been folded down. In this manner, the backrest of the seat performs an additional function of support for a tray, once the backrest has been folded down. The expression "substantially horizontal" is intended to mean "horizontal" to within plus or minus 5°. An independent tray is a tray which is not permanently connected to the rear face of the backrest of the seat. That tray is configured as an object which is dissociated from the seat in terms of the fixing means in order to be stowed in a non-removable manner on the rear face of the backrest. The tray may represent a large number of objects such as, for example, a games console, a portable computer or a paper document support. A deployed position is a position for which an individual sitting in an adjacent seat in the vehicle could readily read a text or look at drawings or photographs on said tray, under good conditions of comfort and ergonomics, without having to incline his head in an exaggerated manner. The tray is fixed in a sufficiently stable and solid manner to said rear face for an individual to be able to write on sheets of paper secured to said tray or to be able to apply a pressure to a touch screen of a data-processing tablet in order to start a particular function. The fixing means may cooperate with complementary fixing means for the tray, or cooperate directly with said tray.

The deployed position is advantageously a position which may be either vertical or inclined but which is not horizontal. In other words, the position of the tray is substantially similar to the inclined position of a written work which an individual would hold in his hand, and which he would read whilst sitting in a comfortable position.

In a preferred manner, the fixing means comprise at least one groove which allows the tray to be received and retained in a deployed position on the rear face of the backrest. It is supposed that the width of the groove is compatible with the thickness of the tray so that the tray can be partially accommodated therein. The grooves may equally well be formed in the region of the center of the backrest or in the region of the extreme portion thereof which may be used as a headrest. A specific position of the tray corresponds to each groove, the objective being to orientate the tray towards an adjacent seat. Each groove may be rectilinear or curvilinear. This type of fixing means has particularly small dimensions because the support platform is constituted by the backrest of the seat already present in the vehicle and each groove advantageously replaces a bulky interface component which may be used for fixing the tray in the deployed position thereof. Similarly, for this configuration, it is not necessary for the tray to be provided with complementary fixing means which are capable of cooperating with the fixing means of the seat backrest. This fixing means is simple, has small dimensions and is completely effective.

The rear face of the backrest preferably comprises four grooves, two grooves being aligned in accordance with a first axis and the other two grooves being aligned in accordance with a second axis, two grooves of the same axis being used to fix the tray in a given position. With this configuration having four grooves, the tray may thus occupy two separate positions on the folded seat.

In an advantageous manner, the two axes intersect each other, the two grooves of the same axis being positioned at one side and the other of the notional intersection location between said axes. In this manner, a first position of the tray is derived from the second position by means of a notional rotation about the intersection location between the two axes. Thus, the tray may be orientated in accordance with two separate positions on the folded backrest by means of a simple pivoting action about itself, said tray having to be withdrawn beforehand from the grooves which it occupies in order to be subjected to said pivoting action.

Advantageously, each groove is covered by a biasing element, the tray being engaged in each groove by repelling said element. Each element tends to naturally cover a groove and the tray is must be manipulated in order to move away each of said elements when it is introduced into each of said grooves. Once it is located in its definitive position, each element contributes to locking that position by applying a pressure against said tray. That biasing element, by applying a pressure to the tray, makes it possible to prevent it from having to be introduced too deeply into each groove in order to obtain the stability required. It should be noted that each biasing element is naturally spaced apart from each groove when the tray is introduced into said grooves, thereby requiring no particular effort.

According to an embodiment preferred according to the invention, the fixing means are formed so as to stow a tray which is used as a support for a paper document and which has a retention clip for said document. That tray may thus be used for fixing one or more sheets of paper by means of the clip. The fixing means are sufficiently solid not only to allow the tray to be retained in a deployed position but also to allow said tray to withstand the pressure applied by a pen or a pencil held by an individual who is writing on a paper document fixed to said tray.

In a preferred manner, the tray is stored in the backrest of said seat when it is in the storage mode. In this manner, the seat allows a double function to be performed, in full and alone, which function is, on the one hand, to store the tray in a stored position and, on the other hand, to allow said tray to be fixed in a functional position.

The invention further relates to a tray which is intended to be fitted to a seat according to the invention and whose main technical feature is that it comprises an elongate planar body having at one of the ends thereof an inclined edge which is provided with two lateral lobes and, at the opposite end thereof, a clip which is intended to retain a paper document. A paper document may be, for example, constituted by a single sheet, a block or a book.

Finally, the invention relates to a vehicle which comprises a row of at least two seats and the main technical feature of which is that it comprises at least one seat according to the invention.

According to a preferred embodiment of a vehicle according to the invention, said vehicle comprises a row of three seats, the central seat of which is in accordance with the invention. In this manner, once the backrest of the central seat has been folded down, the tray may be withdrawn by one of the two occupants of the two adjacent seats and be deployed on the folded backrest with an orientation towards one of said adjacent seats. The driver or the passenger may thus make use of this tray.

The seats according to the invention have the advantage of having a constant spatial requirement in relation to a conventional seat already in existence whilst providing a complete function connected with the tray. This is because they simultaneously allow the tray to be fixed in an operational position, for which an individual may read a text on said tray in a comfortable and pleasant manner, and a storage space to be provided for said tray in the storage mode. They further have the advantage of involving a minimum of components for retaining the stored tray in the backrest and for deploying it in a functional position on the backrest, therefore making them easy to produce, involving small dimensions and moderate costs.

BRIEF DESCRIPTION OF THE DRAWINGS

A detailed description of a preferred embodiment of a seat according to the invention will be given below with reference to FIGS. 1 to 4, in which.

DETAILED DESCRIPTION

Figure 1:
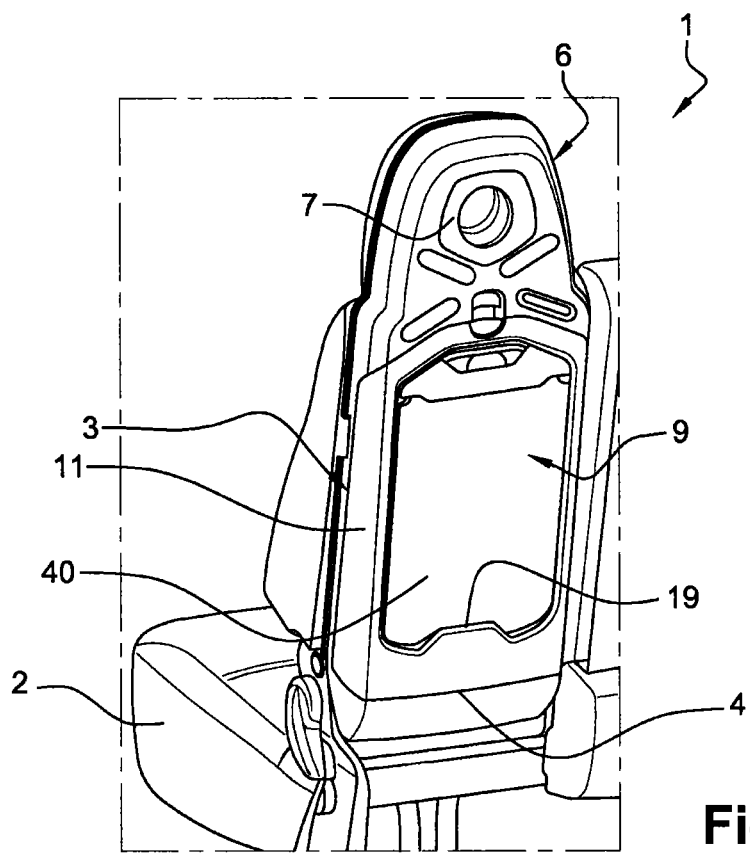
FIG. 1 is a rear perspective view of a seat according to the invention in a functional position.
Figure 2:
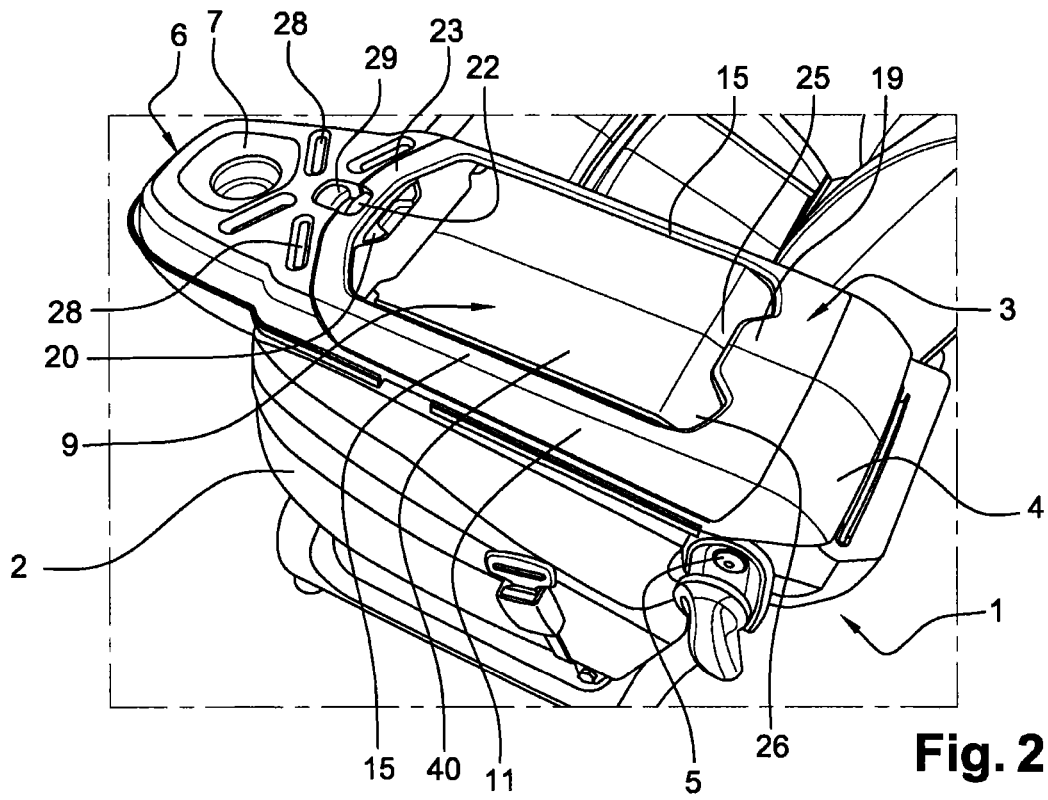
FIG. 2 is a perspective view of the seat of FIG. 2 in a folded position, the tray being stored in the backrest.

With reference to FIGS. 1 and 2, a seat 1 according to the invention conventionally comprises a seat member 2 and a backrest 3 which is capable of pivoting between a functional position for which it is deployed on the seat member 2, as FIG. 1 shows, and a substantially horizontal, folded position for which it moves into contact with the seat member, as FIG. 2 shows. The backrest 3 thus has a first end 4 near the seat member 2 and is mounted so as to pivot about a horizontal and transverse axis 5, and a second end 6 corresponding to a headrest 7. It is assumed that a longitudinal axis of the backrest 3 connects the first end and the second end 4, 6. The backrest 3 comprises a rear face in which a tray 9 which is provided with a clip 27 is stored, said tray 9 being planar and having a small thickness, and being arranged on said rear face providing a given continuity in terms of the outer envelope of the seat 1.

Figure 3:
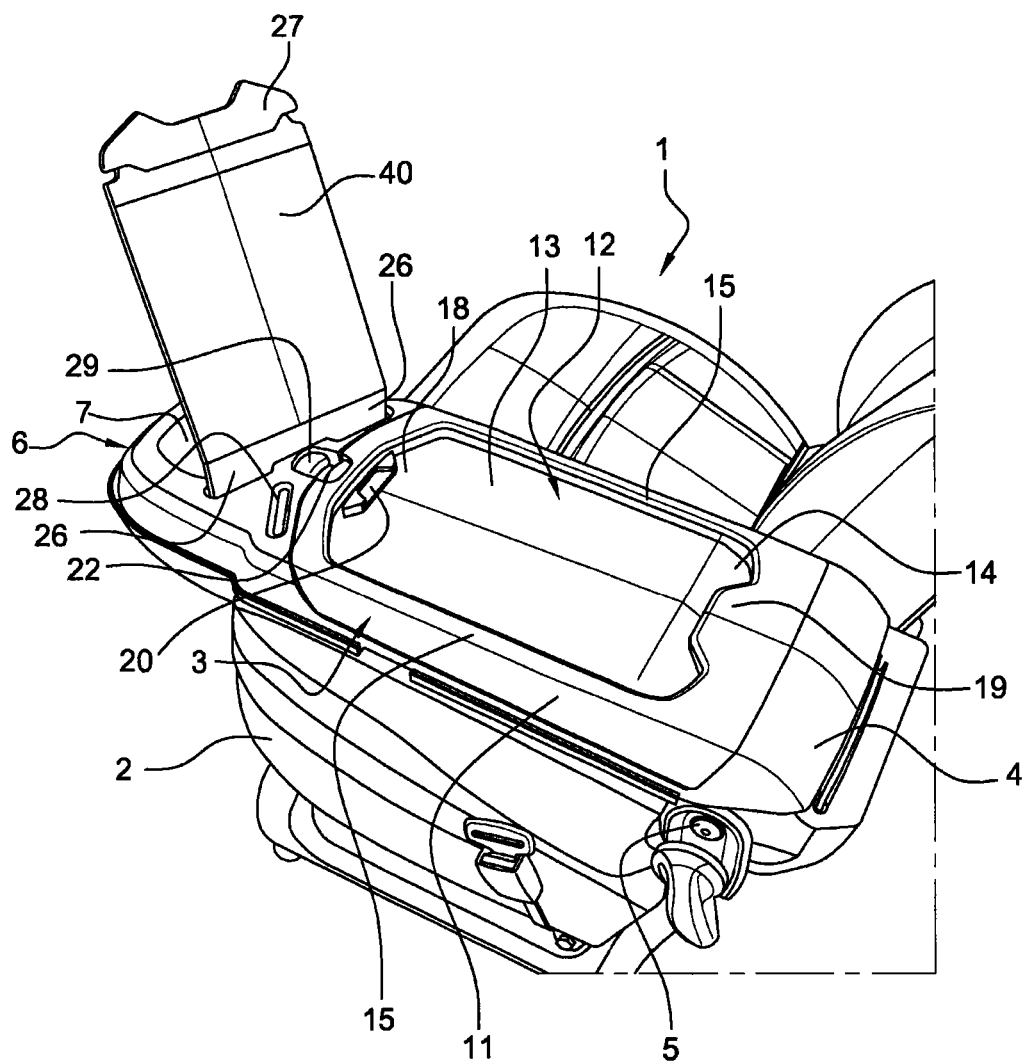
FIG. 3 is the view of FIG. 2, the tray being deployed on the folded seat.

With reference to FIG. 3, the backrest 3 comprises a location in which there is fixed in a non-removable manner an approximately rectangular receiving frame 11 whose thickness is less than that of the backrest 3, whose width is identical to that of the backrest 3 and whose length is less than that of the backrest 3. In this manner, the frame 11 is included in the backrest 3 and partially delimits its width. That frame 11 comprises a recess 12 which has a planar base 13 and which is extended by an indentation 14. The portion of the recess 12 corresponding to the planar base 13 is delimited by two large parallel segments 15, by a small segment 16 which is perpendicular to said large segments 15 and by a profiled segment 17 which allows the recess 12 to have a central extension 18. The indentation 14 is in the form of a base inclined in a direction which accentuates the depth of said recess 12, said inclined base being in continuation of the planar base 13 in the region of the small segment 15 thereof. The frame 11 has a central overhang 19 of a material which overhangs the indentation 14, said overhang 19 being positioned in alignment with said indentation 14 without occupying the portion of the recess 14 with a planar base 13. The recess 12 extends along a longitudinal axis of the backrest 3 so that its central extension 18 is located near the headrest 7 and so that the indentation 14 is located near the rotation axis 5 of the backrest 3 on the seat member 2. The frame 11 may be withdrawn from the backrest 3 by means of a pressure on a pin 22 which extends from an edge 23 of said frame 11. A locking mechanism which involves a mechanical stop is positioned in the receiving frame 11 in the region of the central extension 18 of the recess 12, said mechanism comprising an activation push-button 20 which extends out of the recess 12 between an end edge 23 of said frame 11 delimiting the central extension 18 of the recess 12 and the tray 9.

With reference to FIGS. 2 and 3, the tray 9 is constituted by a thin, planar plate 40 of substantially rectangular form, said plate 40 being extended along a longitudinal axis by, on the one hand, an inclined rim 25 having two lateral lobes 26 and, on the other hand, a conventional clamping clip 27 which is configured to retain at least one sheet of paper against the plate 40. That tray 9 therefore acts as a support for a paper document so that a person may read said document or may write thereon.

With reference to FIG. 2, in a storage position, the tray 9 occupies the recess 12 so that its inclined rim 25 is in the indentation 14, the two lobes 26 being positioned at one side and the other of the central overhang 19 of the frame 11 and so that the plate 40 is in contact with the planar base 13 of the recess 12, the end of the plate 40 comprising the clip 27 cooperating with the locking mechanism. The tray 9 is stored in the backrest 3 without any of its portions extending out of the recess 12, said tray 9 ensuring a given continuity of the surface, in the region of the rear face of said backrest 3. When the tray 9 is stored in the receiving frame 11 of the rear face of the backrest 3, the activation push-button 20 remains accessible from the outer side of the seat 1. A return element is associated with that push-button 20 so that it remains, by default, in a projecting position in the locking configuration. In this manner, without any pressure on said push-button 20, the tray 9 is by default locked against the backrest 3 of the seat 1. The rear face of the backrest 3 corresponding to the headrest 7 comprises four grooves 28 which are arranged in the form of a cross, two grooves 28 being aligned in accordance with a first axis and the other two grooves 28 being aligned in accordance with a second axis, said axes intersecting with each other, each groove 28 of the same axis being located at each side of the notional intersection location of said axes. Each groove 28 is constituted by a rectilinear aperture which has finite length and which is closed by a biasing removable element, each of said elements being connected to a secondary push-button 29 which is positioned near the activation push-button 20. Each closure element naturally covers the groove 28, pressure on the secondary push-button 29 bringing about the instantaneous retraction of said element in order to release the groove 28 in order to introduce the tray 9 therein.

With reference to FIG. 3, once the tray 9 has been withdrawn from the backrest 3, it may be deployed on said folded backrest 3 in the region of the grooves 28. This is because two aligned grooves 28 are intended to receive the two lobes 26 of the tray 9 so that it occupies a first position, the other two aligned grooves 28 allowing said tray 9 to occupy a second position. The tray 9 may thus be deployed on the folded seat 1 so as to be in a slightly inclined plane with respect to a vertical plane, the clip 27 constituting its highest zone.

Figure 4:
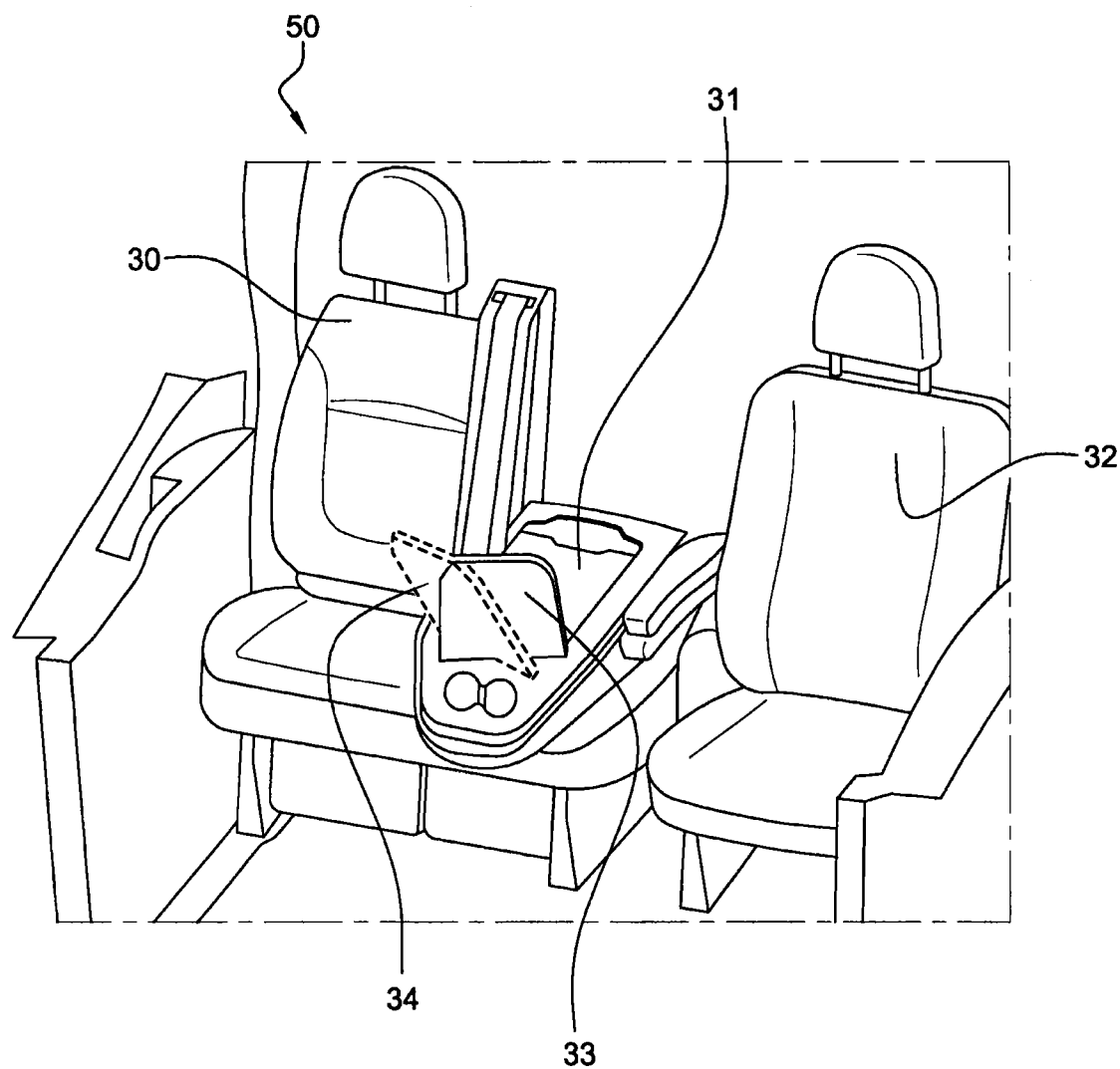
FIG. 4 is a partial perspective view of the interior of vehicle according to the invention.

With reference to FIG. 4, a motor vehicle 50 according to the invention comprises a row of three aligned seats 30, 31, 32, the central seat 31 of which is in accordance with the seat 1 previously described. The tray 9 may thus occupy a first position 33 (shown in solid lines in FIG. 4) which is orientated towards a first adjacent seat 30, or a second position 34 (shown in broken lines in FIG. 4) which is orientated towards another adjacent seat 32. In order to remove any ambiguity, FIG. 4 indicates the tray 9 in two separate positions which it cannot occupy simultaneously, and not a single tray of complex form.

The positioning of a tray 9 in a deployed position on the folded backrest 3, starting from the position thereof stored at the rear of the backrest 3, follows the following steps. Pressure on the activation push-button 20 releases the tray 9, which is withdrawn from the recess 12 by said tray 9 being pivoted about the two lobes 26 thereof placed in the indentation 14 of said recess 12. The tray 9 is brought above the two aligned grooves 28 correspond to the desired position. Pressure on the secondary push-button 29 releases the grooves 28 and the tray 9 is introduced into said grooves 28 in the region of the two lobes 26 thereof. Releasing the secondary push-button 29 allows the tray 9 to be locked in the grooves 28 by means of the biasing elements which apply a pressure against the tray 9. In order to move the tray 9 from its deployed position to its stored position, a pressure on the secondary push-button 29 releases the grooves 28 and the tray 9 can then be withdrawn from said grooves 28. The tray 9 is then inserted in the recess of the receiving frame 11 by first introducing the two lobes 26 thereof into the indentation 14. The tray 9 is then subjected to a rotation in order to be brought into contact with the base of the recess 12. Simultaneously, a pressure on the activation push-button 20 releases the locking mechanism in order to allow the complete insertion of the tray 9 into the recess 12. The pressure on said push-button 20 is then released in order to lock the tray 9 in its storage position behind the backrest 3.

The invention claimed is:

1. A seat of a motor vehicle comprising:
a seat member; and
a foldable backrest including a rear face configured to be in a substantially horizontal position once the backrest has been folded down,
wherein the rear face of the backrest includes at least one groove configured to cooperate with an independent tray to retain the tray in a deployed position on the rear face once the backrest has been folded down, and
wherein the at least one groove is covered by a biasing element, the tray being engaged in the at least one groove by repelling the biasing element.

2. The vehicle seat as claimed in claim 1, wherein the deployed position is a position that may be either vertical or inclined but that is not horizontal.

3. The vehicle seat as claimed in claim 1, wherein the at least one groove is formed to stow the tray used as a support for a paper document and that includes a retention clip for the document.

4. The vehicle seat as claimed in claim 1, wherein the tray is stored in the backrest of the seat when the tray is in a storage mode.

5. The vehicle seat as claimed in claim 4, wherein the tray is stored within a recess in the backrest of the seat when the tray is in the storage mode.

6. The vehicle seat as claimed in claim 5, wherein the at least one groove is spaced apart from the recess in the backrest of the seat.

7. The vehicle seat as claimed in claim 5, wherein the backrest of the seat includes a headrest and the at least one groove is positioned in the headrest.

8. The vehicle seat as claimed in claim 5, wherein no portions of the tray extend out of the recess when the tray is in the storage mode.

9. A tray configured to be fixed to a rear face of the backrest of a seat as claimed in claim 1, comprising an elongate planar body including at one end thereof an inclined edge that is inclined with respect to the planar body, the inclined edge including two lateral lobes and, at an opposite end thereof, a clip configured to retain a paper document.

10. A vehicle comprising a row of at least two seats, and at least one of the at least two seats is the seat as claimed in claim 1.

11. The vehicle as claimed in claim 10, comprising a row of three seats, and a central seat is the at least one seat.

12. A seat of a motor vehicle comprising:
a seat member; and
a foldable backrest including a rear face configured to be in a substantially horizontal position once the backrest has been folded down,
wherein the rear face of the backrest includes four grooves each configured to cooperate with an independent tray to retain the tray in a deployed position on the rear face once the backrest has been folded down, and
wherein two grooves of the four grooves are aligned in accordance with a first axis and the other two grooves of the four grooves are aligned in accordance with a second axis, and the two grooves of the first axis or the two grooves of the second axis are used to fix the tray in a given position.

13. The vehicle seat as claimed in claim 12, wherein the first axis intersects the second axis, the two grooves of the first axis are positioned on opposite sides of a notional intersection location between the first axis and the second axis, and the two grooves of the second axis are positioned on opposite sides of the notional intersection.

\* \* \* \* \*